Feb. 3, 1959  E. E. TILLMAN  2,871,742
DEVICE FOR THREADING PLUGS THROUGH PUNCTURES IN TIRES
Filed Jan. 17, 1955  2 Sheets-Sheet 1
FIG. 1
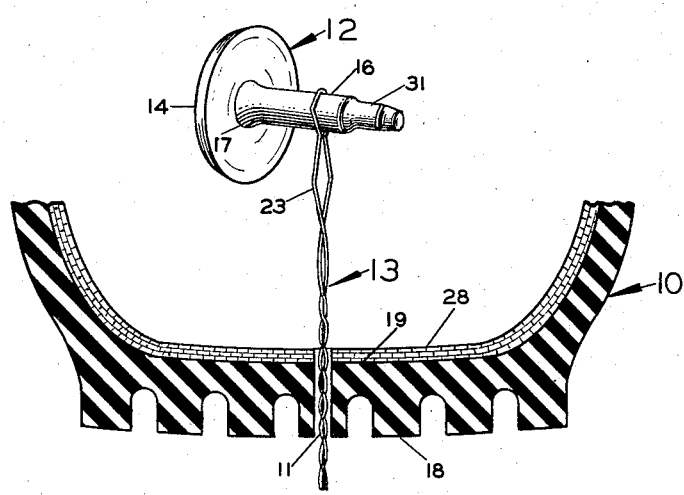
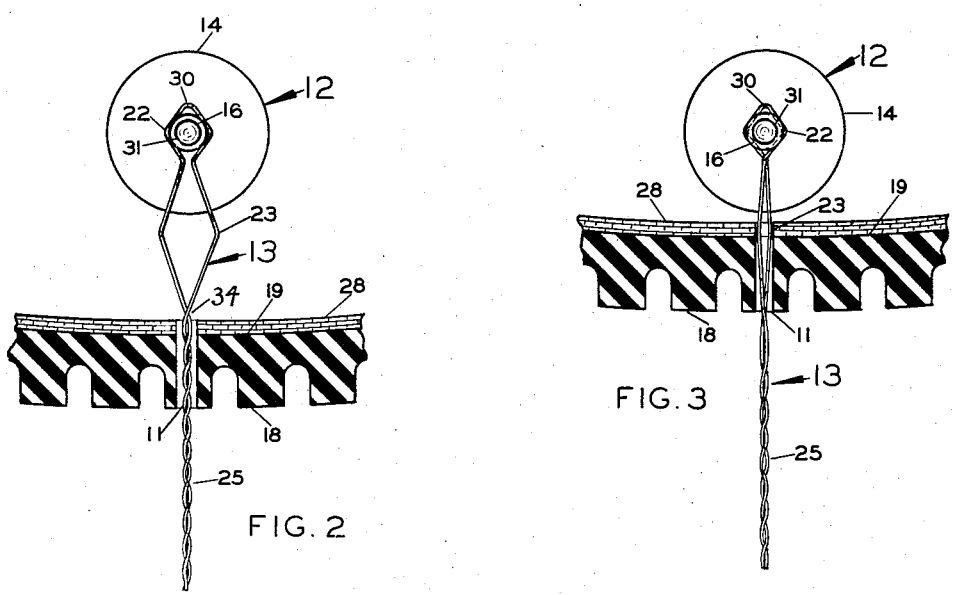
FIG. 2
FIG. 3
*INVENTOR.*
EDWIN E. TILLMAN
BY
Salvatore G. Militana,
ATTORNEY Feb. 3, 1959   E. E. TILLMAN   2,871,742
DEVICE FOR THREADING PLUGS THROUGH PUNCTURES IN TIRES
Filed Jan. 17, 1955   2 Sheets-Sheet 2
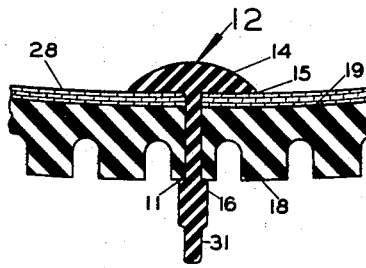
FIG. 4
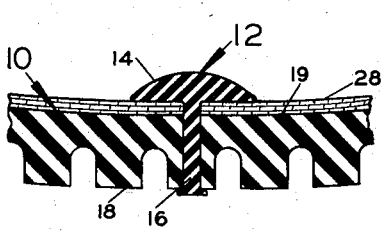
FIG. 5
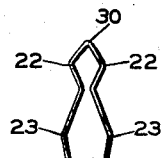
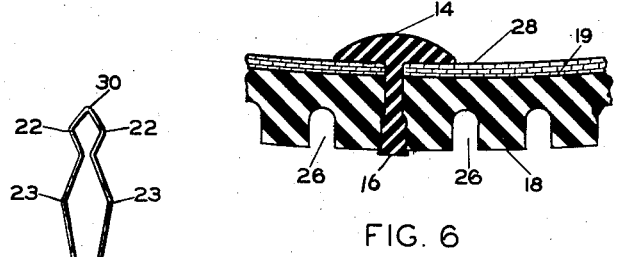
FIG. 6
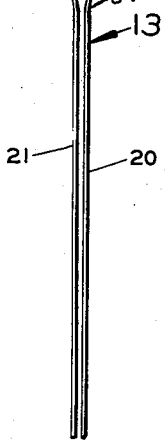
FIG. 8
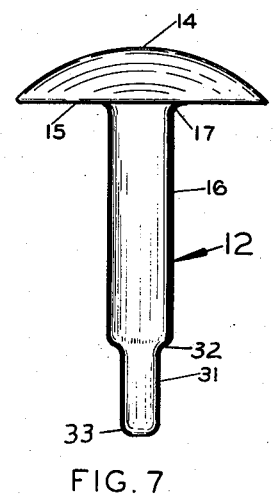
FIG. 7
FIG. 9
*INVENTOR.*
EDWIN E. TILLMAN
BY
*Salvatore G. Militano,*
ATTORNEY though in a lesser degree because the ends 20, 21 of the insertion tool 13 have slightly enlarged the hole 11. However, the stem 16 does not completely resume its original shape because it is held in a stretched condition by the head portion 14 at the bottom side and the excess portion 29 of the stem 16 extending out of the hole 11 on the outer side of the tire 10. The excess stem portion 29 is now sheared off at the outer surface of the tire 10 as shown by Figure 4. Then due to the resilient characteristics of the stem portion 16 of the rivet 12, the sheared off end attempts to resume its normal condition and in so doing, the sheared off end spreads out to form a substantially flat cap 35 over the end of the hole 11 which together with the stem portion 16 filling the hole 11 and the head portion 14 sealing the inner end of the hole 11 along the liner 28, a complete seal at three positions of the hole 11 is formed resulting in the formation of a strong leak proof repair of the puncture 11 in the tubeless tire 10.

2

Figure 6 shows another type of puncture 36 which may occur in a tire between the treads 18. The plug 12 is applied to this type puncture 36 in the same manner as described above and as shown by Figures 1 through 5.

Having described my invention, I claim:

A device for inserting a resilient sealing plug into a puncture in a tubeless tire which comprises a length of spring wire bent at its midportion and folded down on itself to form a pair of parallel leg portions, the upper portion of the wire being bent outwardly to form an upper pair of shoulders and a lower pair of shoulders, the shoulders of the upper pair extending outwardly a greater distance than the shoulders of the lower pair, the distance between the lower pair of shoulders being approximately equal to the diameter of the stem of the sealing plug, said leg portions being wound on each other from the foot of the lower pair of shoulders to the lower ends of the leg portions.

No references cited.

and position whereby the puncture 11 becomes tightly sealed by the stem 16, the stem 16 taking the shape of the puncture 11 and exerting an outward pressure or force in a direction of the side walls of the puncture 11 to seal the hole 11 thereby. The stem 16 is then cut with scissors or shears a slight distance below the level of the tread 18. That portion of the stem 16 which is free of the puncture 11 and beyond the tread 18 is expanded to approximately its normal size and forms a head overlapping the outer edges of the puncture 11 to assure a seal of that portion of the puncture 11. Also, in the event the tire 10 is caused to skid at the position of the stem 16, a force will be exerted by the pavement pulling on the stem 16 to bring the head 14 into tighter and closer engagement with the inner liner 19 of the tubeless tire 10.

As shown by Figure 6 if the puncture occurs in the tubeless tire between the treads 18 as at 26, the stem 16 will tend to resume its normal and unstretched condition and will expand to fill the puncture as well as the space 26 between the treads 18. The seal is effected by the stem 16 exerting a yielding pressure outwardly against the side walls of the puncture in the bottom wall 19 of the tubeless tire 10.

Having described by invention, what I claim as new is:

A tool for inserting a plug in a puncture in the repair of tubeless tires comprising a spring wire member bent at substantially its mid-portion to form a pair of leg portions, each of said leg portions being wound upon the other extending from intermediate its end portions to one end of said leg portions whereby a handle is formed for manipulating said tool in inserting said tool in said puncture, said leg portions extending angularly away from each other at their intermediate portion for a distance and then extending in a substantially similar but reverse angular direction toward each other to form a pair of outwardly directed shoulder means, said leg portions extending again angularly away from each other for a shorter distance than said first mentioned distance to form opposed inwardly directed shoulders and then extending again toward each other and being integrally joined at said mid-portion of the wire, so as to form a small loop at the other end of said leg portions adjacent said opposed shoulders for engaging said plug securely as said outwardly directed shoulder means become compressed upon the threading of said tool through said puncture whereby said plug may become properly seated in said puncture upon the pulling of said tool therethrough.

References Cited in the file of this patent

UNITED STATES PATENTS

| | | |
|---|---|---|
| 634,193 | Wingate | Oct. 3, 1899 |
| 1,000,168 | Glanz | Aug. 8, 1911 |
| 1,501,750 | Colby | July 15, 1924 |
| 1,545,831 | Hirst | July 14, 1925 |
| 1,833,194 | Young | Nov. 24, 1931 |
| 1,901,231 | Fisher | Mar. 14, 1933 |
| 2,280,006 | Pfeiffer | Apr. 14, 1942 |
| 2,668,570 | Pfeiffer | Feb. 9, 1954 |